United States Patent
Mease et al.

(10) Patent No.: US 6,688,711 B1
(45) Date of Patent: Feb. 10, 2004

(54) COMPONENT SLIDE ASSEMBLY

(75) Inventors: Keith D. Mease, Gibbstown, NJ (US); Richard M. Rogala, Phoenixville, PA (US); Terry W. Louth, Narvon, PA (US); Norman K. Newman, Hatfield, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 10/047,261

(22) Filed: Jan. 15, 2002

(51) Int. Cl.[7] .............................. A47B 81/00; G06F 1/16
(52) U.S. Cl. ..................................... 312/223.2; 361/681
(58) Field of Search ........................... 312/223.2, 265.6, 312/323, 334.7, 334.16, 334.18, 334.19, 334.21; 361/725, 727, 681

(56) References Cited

U.S. PATENT DOCUMENTS

| | | | | |
|---|---|---|---|---|
| 4,646,658 A | * | 3/1987 | Lee ............................ 108/143 |
| 5,213,401 A | * | 5/1993 | Hatcher ..................... 312/208.1 |
| 5,571,256 A | * | 11/1996 | Good et al. .................... 211/26 |
| 5,941,615 A | * | 8/1999 | Ito et al. ....................... 312/7.2 |
| 6,230,903 B1 | * | 5/2001 | Abbott ........................... 211/26 |
| 6,288,911 B1 | * | 9/2001 | Aoki et al. ................... 361/801 |
| 6,359,843 B1 | * | 3/2002 | Motoki ..................... 369/30.92 |
| 6,536,728 B1 | * | 3/2003 | Hagglund et al. ......... 248/286.1 |

* cited by examiner

*Primary Examiner*—Anita King
(74) *Attorney, Agent, or Firm*—Lise A. Rode; Mark T. Starr; Ratner & Prestia

(57) ABSTRACT

A modular chassis assembly is provided, including a chassis defining an access opening, an arm having a distal end portion coupled to the chassis and a proximal end portion spaced from the distal end portion, and a modular component coupled to the proximal end portion of the arm and configured for insertion into the chassis along an insertion axis. The arm is configured to facilitate displacement of the modular component along the insertion axis and movement of the modular component at an angle to the insertion axis, thereby at least partially facilitating access to the chassis through the access opening.

31 Claims, 11 Drawing Sheets

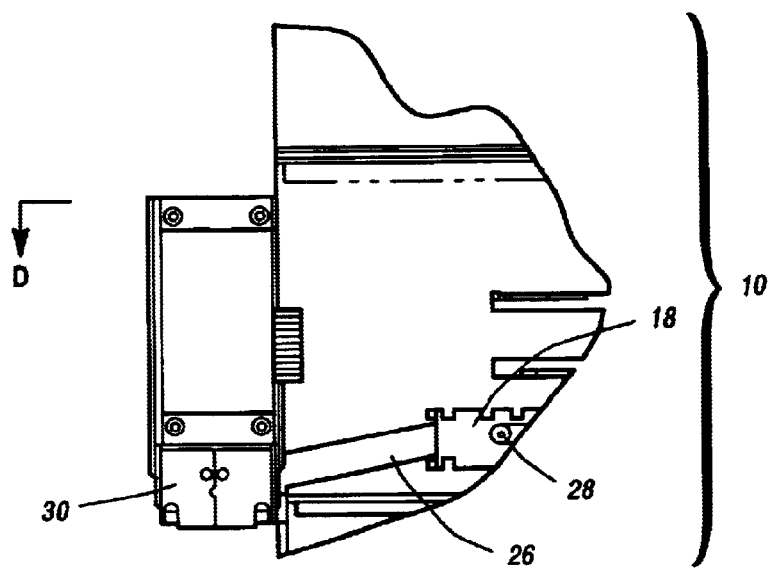
*Figure 2*
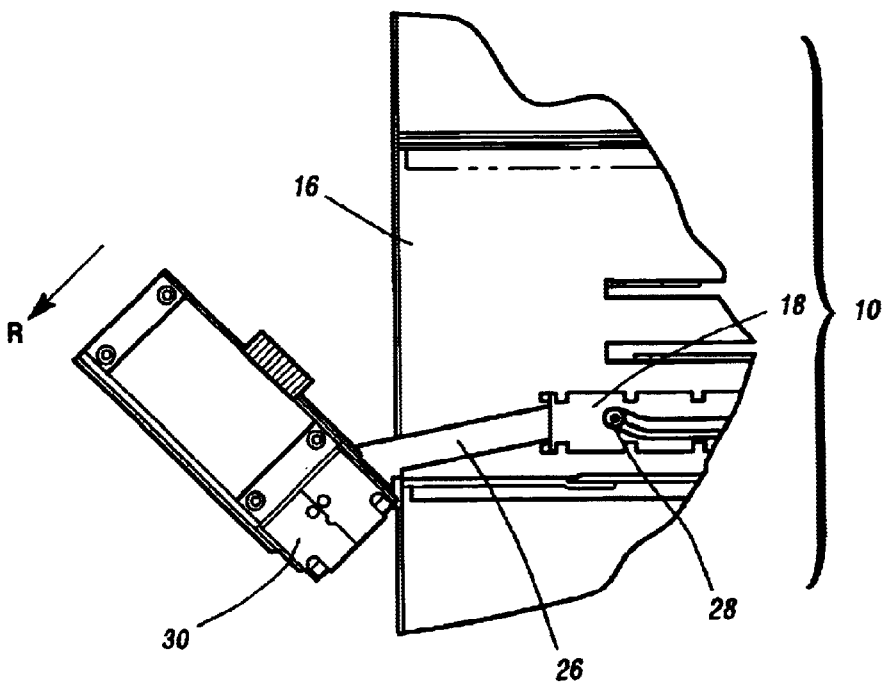
*Figur 3*

COMPONENT SLIDE ASSEMBLY

FIELD OF THE INVENTION

This invention relates to a component slide assembly. More particularly, this invention relates to a modular chassis assembly having a modular component configured for insertion into the chassis.

BACKGROUND OF THE INVENTION

This invention addresses the problems associated with the accessibility of nested components in modular assemblies such as electronic systems. Often, dislocation of forward plug-in assemblies and component modules may be needed to allow access when rearward-located components require servicing or removal or adjustment. In some cases, the forward component may be required to remain functional when dislocated to ensure continued system availability. In many cases, it is desirable for the forward component to be dislocated fully from its installed volume while remaining attached to the system in its "service position" without service personnel assistance.

Currently, forward components may be completely removed to accommodate system servicing. However, such practice may result in damaged, mishandled, or misplaced components. Accordingly, there remains a need for an improved modular chassis assembly that can be configured to provide for access to an interior of the chassis.

SUMMARY OF THE INVENTION

A modular chassis assembly is provided, including a chassis defining an access opening, an arm having a distal end portion coupled to the chassis and a proximal end portion spaced from the said distal end portion, and a modular component coupled to the proximal end portion of the arm and configured for insertion into the chassis along an insertion axis. The arm is configured to facilitate displacement of the modular component along the insertion axis and movement of the modular component at an angle to the insertion axis, thereby at least partially facilitating access to the chassis through the access opening.

BRIEF DESCRIPTION OF THE DRAWINGS

Exemplary embodiments of this invention will be described with reference to the figures, of which:

FIG. 2 is a side view of the modular chassis assembly shown in FIG. 1, with a modular component in a partially extended position;

FIG. 3 is a side view of the modular chassis assembly shown in FIG. 1, with the modular component in a further extended position;

DETAILED DESCRIPTION OF THE INVENTION

Figure 1:
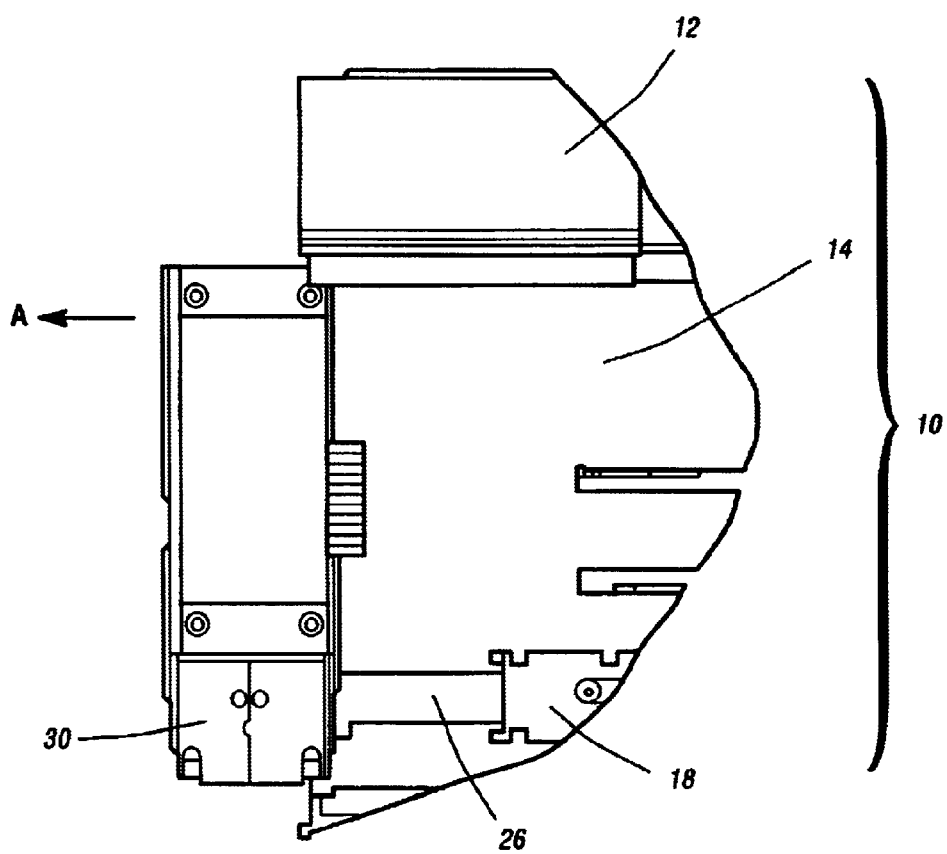
FIG. 1 is a partial side view of an embodiment of a modular chassis assembly according to exemplary aspects of this invention.

Preferred features of selected embodiments of this invention will now be described with reference to the figures. It will be appreciated that the spirit and scope of the invention is not limited to the embodiments selected for illustration. Also, it should be noted that the drawings are not rendered to any particular scale or proportion. It is contemplated that any of the configurations and materials described hereafter can be modified within the scope of this invention.

Referring to the figures generally, a modular chassis assembly 10, according to one exemplary embodiment of this invention, is configured to displace a component in order to provide access to an interior of a chassis. More specifically, the modular chassis assembly such as assembly 10 includes a chassis such as chassis 12 defining an access opening such as opening 16. The modular chassis assembly 10 also includes an arm such as arm 26 having a distal end portion such as portion 27A coupled to the chassis 12. A modular component such as component 30 is coupled to the arm 26 and is configured for insertion into the chassis 12 along an insertion axis "A."

A cam surface 24 and a cam follower 28 are optionally defined by the chassis 12 and the arm 26. The cam surface 24 and the cam follower 28 can be configured to facilitate movement of the modular component 30 at an angle to the insertion axis "A," thereby at least partially facilitating access to the chassis 12 through the access opening 16. The cam surface 24 is optionally defined by the chassis 12, and the cam follower 28 is optionally provided on the arm 26. Also, the insertion axis "A" can be substantially perpendicular to the opening 16 of the chassis 12.

Optionally, the modular chassis assembly 10 can also include a mounting bracket 18 positioned within an interior 14 of the chassis 12 adjacent the opening 16 of the chassis 12. The mounting bracket 18 can define the cam surface 24. Also, the cam follower 28 can define a pivot axis "B" about which the orientation of the arm 26 is pivotable with respect to the chassis 12.

The modular component 30 is optionally pivotally coupled to the arm 26 for rotation about a rotation axis "C" extending substantially perpendicular to the insertion axis "A" of the chassis 12. The rotation of the modular component 30 about the rotation axis "C" can facilitate rotational movement of the modular component 30 away from the insertion axis "A," thereby at least partially facilitating access to the interior 14 of the chassis 12 through the opening 16 of the chassis 12.

According to another exemplary aspect of this invention, the modular chassis 10 includes a chassis 12 defining an interior 14 and an opening 16 for access to the interior 14, wherein the chassis 12 defines an insertion axis "A" extending substantially perpendicular to the opening 16. The modular chassis assembly 10 also includes a plurality of mounting brackets 18 positioned within the interior 14 of the chassis 12 adjacent the opening 16 of the chassis 12. Each of the mounting brackets 18 defines a cam 20 having a distal surface portion 22 extending substantially parallel to the insertion axis "A" and a proximal surface portion 24 extending at an angle to the insertion axis "A." An arm 26 is coupled to each of the mounting brackets 18. Each of the arms 26 includes a cam follower 28 positioned adjacent the cam 20 of one of the mounting brackets 18. Also, each of the arms 26 has a retracted position with the cam follower 28 adjacent the distal surface portion 22 of the cam 20 of one of the mounting brackets 18 and an extended position with the cam follower 28 adjacent the proximal surface portion 24 of the cam 20 of one of the mounting brackets 18. The cam follower 28 of each of the arms 26 defines a pivot axis "B" about which the orientations of the arms 26 are pivotable with respect to the mounting brackets 18.

According to this aspect of this invention, a modular component 30 of the modular chassis assembly 10 is configured for insertion into the interior 14 of the chassis 12 through the opening 16 of the chassis 12. The modular component 30 is pivotally coupled to the arms 26 for rotation about a rotation axis "C" extending substantially perpendicular to the insertion axis "A" of the chassis 12. The modular component 30 has an installed position at least partially within the interior 14 of the chassis 12 with the arms 26 in the retracted position. The modular component 30 also has a removed or extended position outside the interior 14 of the chassis 12 with the arms 26 in the extended position.

According to this aspect of this invention, the cam follower 28 of each of the arms 26 is configured to facilitate movement of the modular component 30 at an angle to the insertion axis "A." The proximal surface portion 24 of the cam 20 of each of the mounting brackets 18 is configured to facilitate movement of the modular component 30 at an angle to the insertion axis "A." The rotation of the modular component 30 about the rotation axis "C" facilitates rotation of the modular component 30 away from the insertion axis "A." In this manner, access to the interior 14 of the chassis 12 through the opening 16 of the chassis 12 is facilitated.

Referring specifically to FIG. 1, the exemplary embodiment of modular chassis assembly 10 includes a chassis 12 such as a computer housing. The chassis 12 can be formed from sheet metal or any other equivalent metallic or non-metallic material that can be utilized to form a chassis. The chassis 12 defines an interior 14 into which various modular components such as modular component 30 can be installed during use. The modular component 30 can be a fan assembly, for example, or another component of a computer, electronic, or other system. The chassis 12 also defines at least one access opening 16 (FIG. 3), which provides access to the interior 14 of the chassis 12. As is illustrated in FIG. 1, the modular component 30 is positioned at least partially within the interior 14 of the chassis 12 in such a way that it partially or completely blocks the access opening 16. In this position, other components mounted within the interior 14 of the chassis 12 cannot be accessed for service or repair or maintenance or adjustment or any other purpose.

Modular chassis assembly 10 also includes mounting brackets 18, which are mounted to the chassis 12 in a position proximal to the opening 16 of the chassis 12. Further details of mounting brackets 18 will be provided in connection with FIG. 6.

Modular chassis assembly 10 also includes arms 26 that are coupled to the mounting brackets 18. Arms 26 are in turn coupled to the modular component 30. The arms 26 have extended and retracted positions. In their fully retracted positions, arms 26 are retracted within the mounting brackets 18, and the modular component 30 is partially or fully within the interior 14 of the chassis 12. In their fully extended positions, arms 26 are extended from mounting brackets 18, and modular component 30 is at least partially outside of the interior 14 of the chassis 12. Movement of modular component 30 by virtue of the extension and retraction of arms 26 with respect to mounting brackets 18 is at least partially along an insertion axis "A."

Referring now to FIG. 2, modular component 30 is further removed or retracted from the interior 14 of the chassis 12. By virtue of the relative position between the cam follower 28 of each arm 26 and the surfaces of the cam 20 of each mounting bracket 18, the ends of the arms 26 that are coupled to the modular component 30 are moved downwardly (in the orientation illustrated in FIG. 2). In this manner, the modular component 30 is moved outwardly and downwardly in the direction "D." Further details of the operation of the surfaces of cam 20 of the mounting brackets 18 and the cam followers 28 of the arms 26 will be provided later.

Referring now to FIG. 3, the arms 26 are fully extended from the mounting brackets 18, and the modular component 30 is rotated with respect to the arms 26. Such rotation results in a rotational displacement "R," which rotates the modular component 30 away from the insertion axis "A" of the modular chassis assembly 10.

Figure 4:
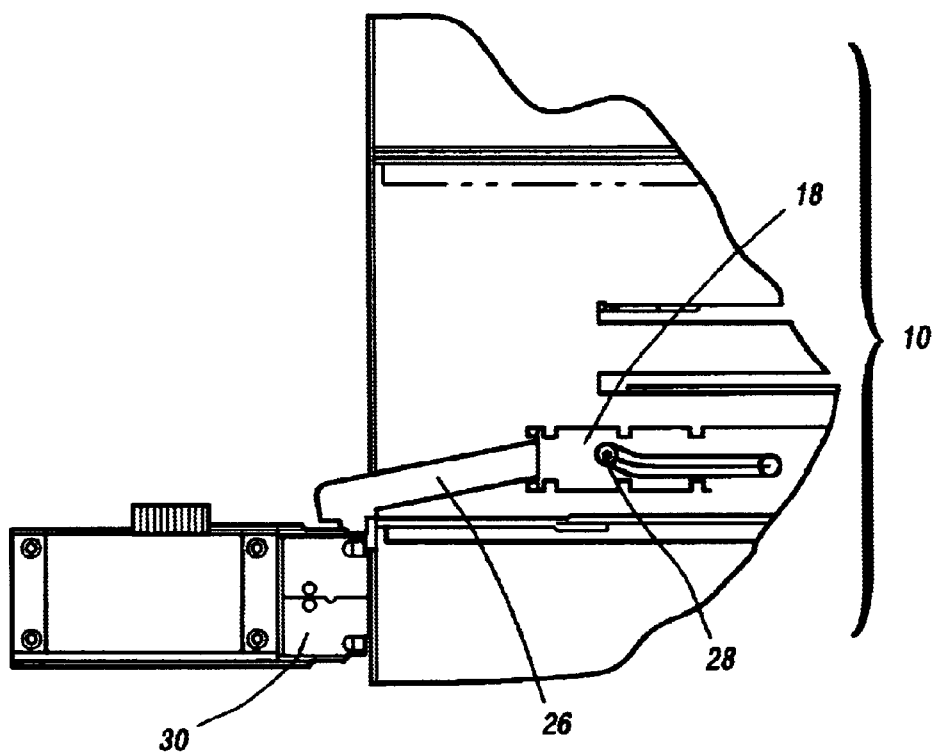
FIG. 4 is a side view of the modular chassis assembly shown in FIG. 1, with the modular component in a fully extended position.

Referring now to FIG. 4, the modular component 30 is illustrated in a fully locked position. In this position, access is provided through the opening 16 to the interior 14 of the chassis 12. As is illustrated in FIG. 4, the modular component 30 is shifted away from the insertion axis "A" and (when rotated into the position in FIG. 4) permits access to the interior 14 of the chassis 12 through its opening 16.

Figure 5A:
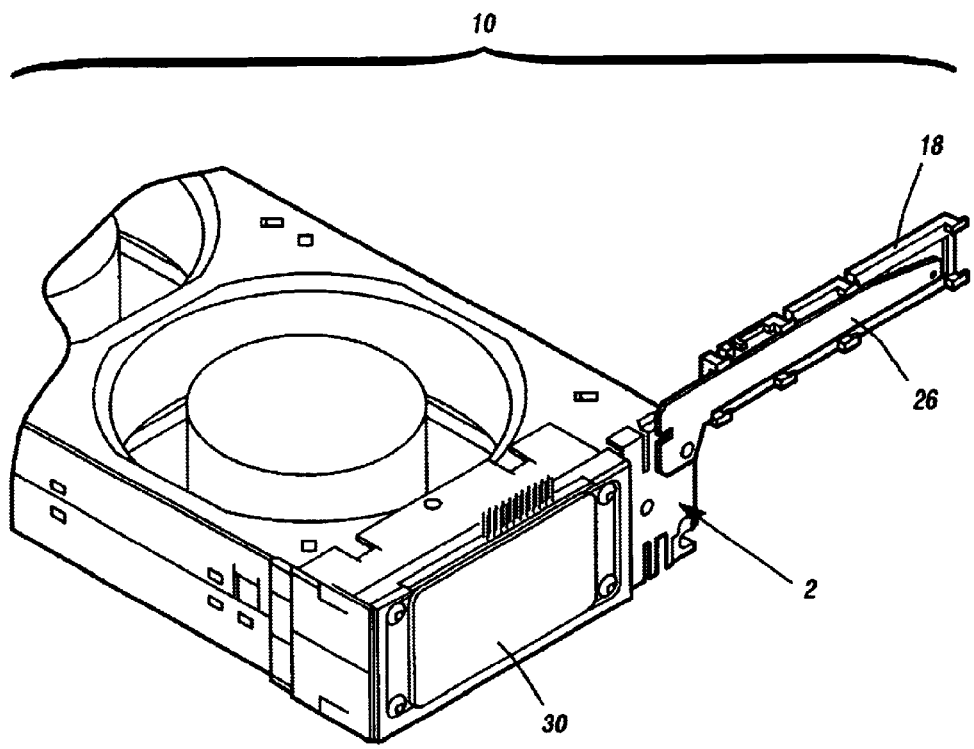
FIGS. 5A and 5B are partial perspective views of exemplary components of the modular chassis assembly shown in FIG. 1.
Figure 5B:
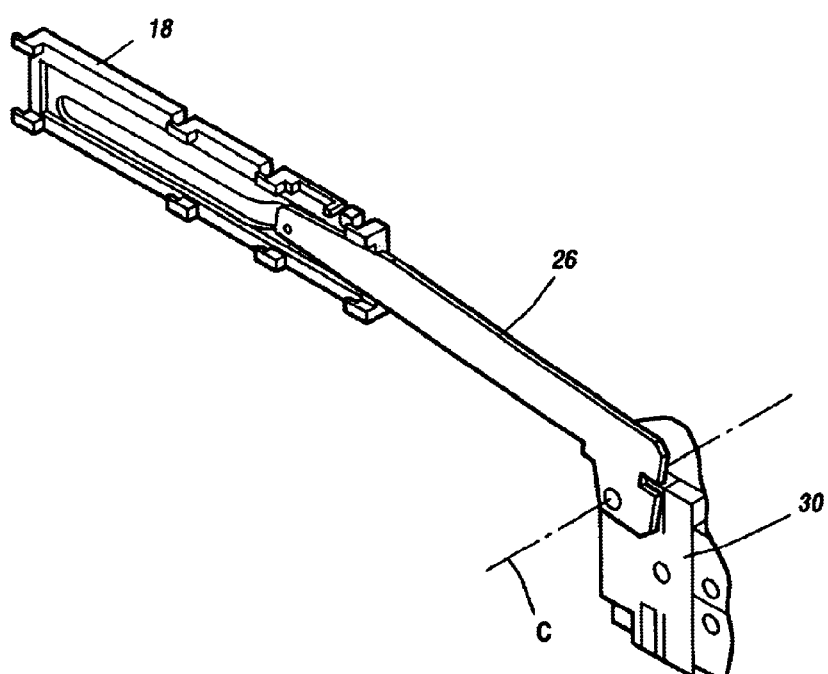

Referring now to FIGS. 5A and 5B, selected components of the modular chassis assembly 10 are illustrated in greater detail. Specifically, FIGS. 5A and 5B show the modular component 30, arm 26, and bracket 18 of the modular chassis assembly 10. In FIG. 5A, the arm 26 is fully retracted within mounting bracket 18. In FIG. 5B, the arm 26 is fully extended from mounting bracket 18. In both of FIGS. 5A and 5B, the modular component 30 is in a fully rotated position with respect to arm 26. The coupling between the modular component 30 and the arm 26 defines a rotation axis "C," which is illustrated in FIGS. 5A and 5B.

Figure 6:
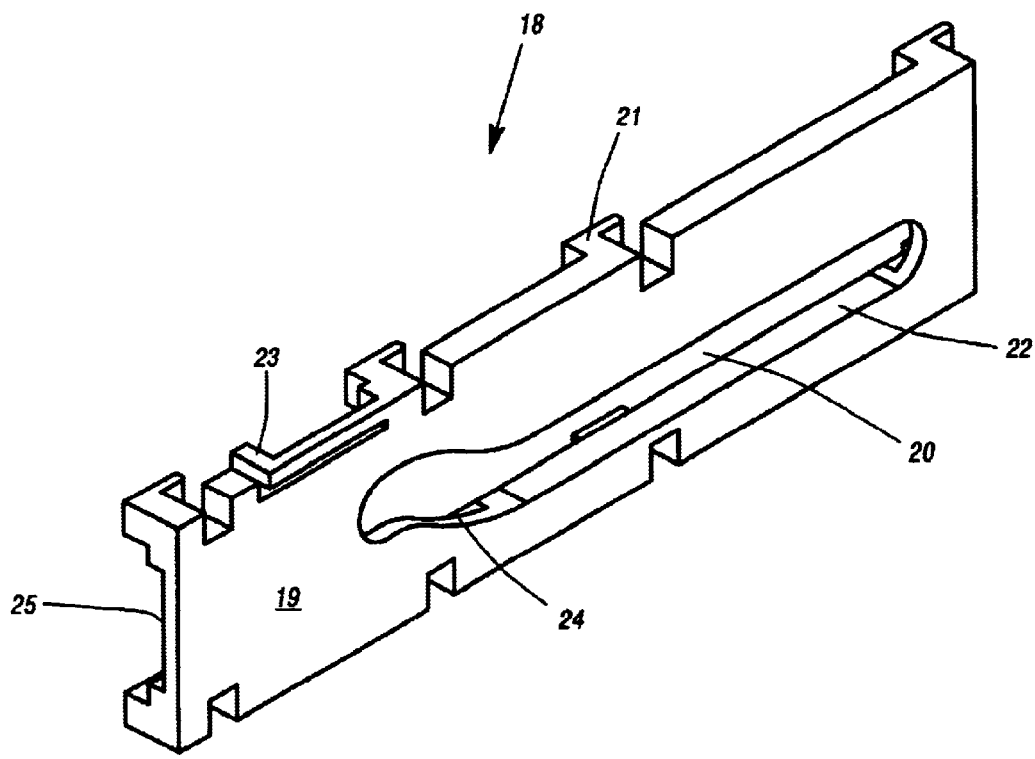
FIG. 6 is a perspective view of an exemplary embodiment of a mounting bracket component of the modular chassis assembly shown in FIG. 1.

Referring now to FIG. 6, features of an exemplary embodiment of mounting bracket 18 are illustrated. Mounting bracket 18 can be formed from a variety of metallic and non-metallic materials. For example, mounting bracket 18 can be molded or otherwise formed from a polymeric material. As mentioned previously, mounting bracket 18 defines a cam 20 having a distal surface portion 22 and a proximal surface portion 24. Distal surface portion 22 extends substantially parallel to the insertion axis "A," thereby facilitating movement of arm 26 and modular component 30 in a direction substantially parallel to the insertion axis "A." Proximal surface portion 24 of cam 20 is orientated to extend at an angle to the insertion axis "A." Accordingly, proximal surface portion 24 facilitates the movement of arm 26 in such a way that the modular component 30 is moved at an angle to the insertion axis "A."

Generally, mounting bracket 18 has a body 19 from which a plurality of mounting features 21 extend. These mounting features 21 are configured to extend through openings (not shown) defined in the chassis 12, such that the mounting bracket 18 can be slid into a mounted position adjacent to the opening 16 of the chassis 12. A flexible locking feature 23 is configured and positioned to extend into an opening (not shown) defined in the surface of the chassis 12 in order to lock the mounting bracket 18 in place. More specifically, as the mounting features 21 of the mounting bracket 18 are slid into a position of engagement with respect to chassis 12, the end of locking feature 23 becomes aligned with an opening in the surface of the chassis 12. Upon such alignment, the locking feature 23 will snap into position, thereby preventing or impeding sliding movement of the mounting bracket 18 with respect to the surface of the chassis 12 so that the mounting features 21 cannot easily become aligned with the openings in the surface of the chassis 12. In this manner, inadvertent dismantling of the mounting bracket 18 from the chassis 12 is prevented.

As is illustrated in FIGS. 5A, 5B and 6, body 19 of mounting bracket 18 defines a channel 25 that is sized and positioned to receive at least a portion of the arm 26. As is illustrated in FIGS. 5A and 5B, the arm 26 is illustrated within the channel 25 of the body 19 of the mounting bracket 18 in its retracted and extended positions, respectively. As will be described later in further detail, the movement of the cam follower 28 of the arm 26 along cam 20 to the proximal surface portion 24 of cam 20 causes movement of the cam follower-end of the arm 26 upwardly (in the orientation illustrated in the figures). By virtue of the surfaces of the channel 25 of the body 19 of the mounting bracket 18, the relative position of the cam follower-end of the arm 26 and the channel 25 causes the opposite end of the arm 26 to move downwardly (in the orientation illustrated in the figures). In this manner, the modular component 30 is moved downwardly at an angle with respect to the insertion axis "A." The relationship between the arm 26, the mounting bracket 18, and the modular component 30 with respect to the insertion axis "A" can be seen in FIGS. 2–4 and 5B.

Figure 7:
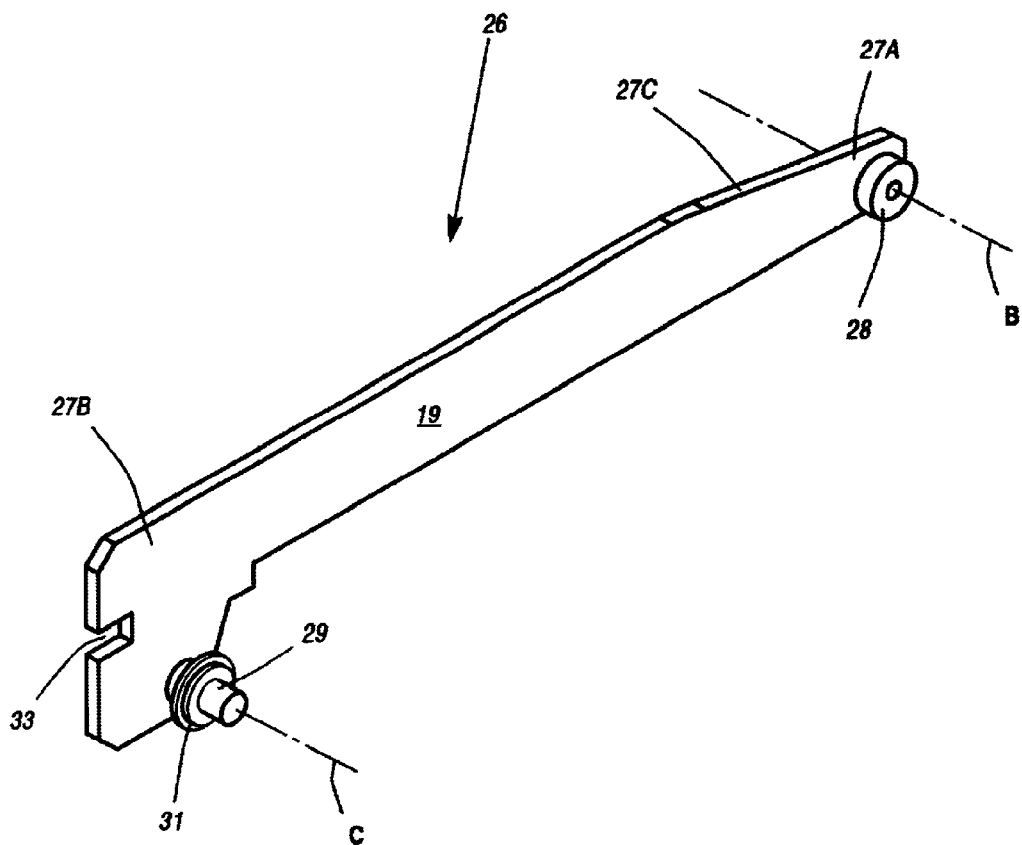
FIG. 7 is a perspective view of an exemplary embodiment of an arm component of the modular chassis assembly shown in FIG. 1.

Referring now to FIG. 7, features of an exemplary embodiment of arm 26 are illustrated. As mentioned previously, arm 26 includes a cam follower 28, which defines a pivot axis "B." The arm 26 can be rotated about pivot axis "B," with respect to the chassis 12. Arm 26 has a body, which has a distal end portion 27A, a proximal end portion 27B, and a ramped portion 27C. A stud 29 is provided at proximal end portion 27B of arm 26 for coupling between the arm 26 and the modular component 30. Stud 29 defines the rotation axis "C" shown in FIGS. 5A and 5B. A washer or flange 31 is provided on stud 29 to facilitate such engagement between the arm 26 and the modular component 30. The proximal end portion 27B of arm 26 also defines a recess 33 to facilitate locking of the position of arm 26 with respect to modular component 30. Further details of the locking mechanism utilizing recess 33 will be described later.

Figure 8:
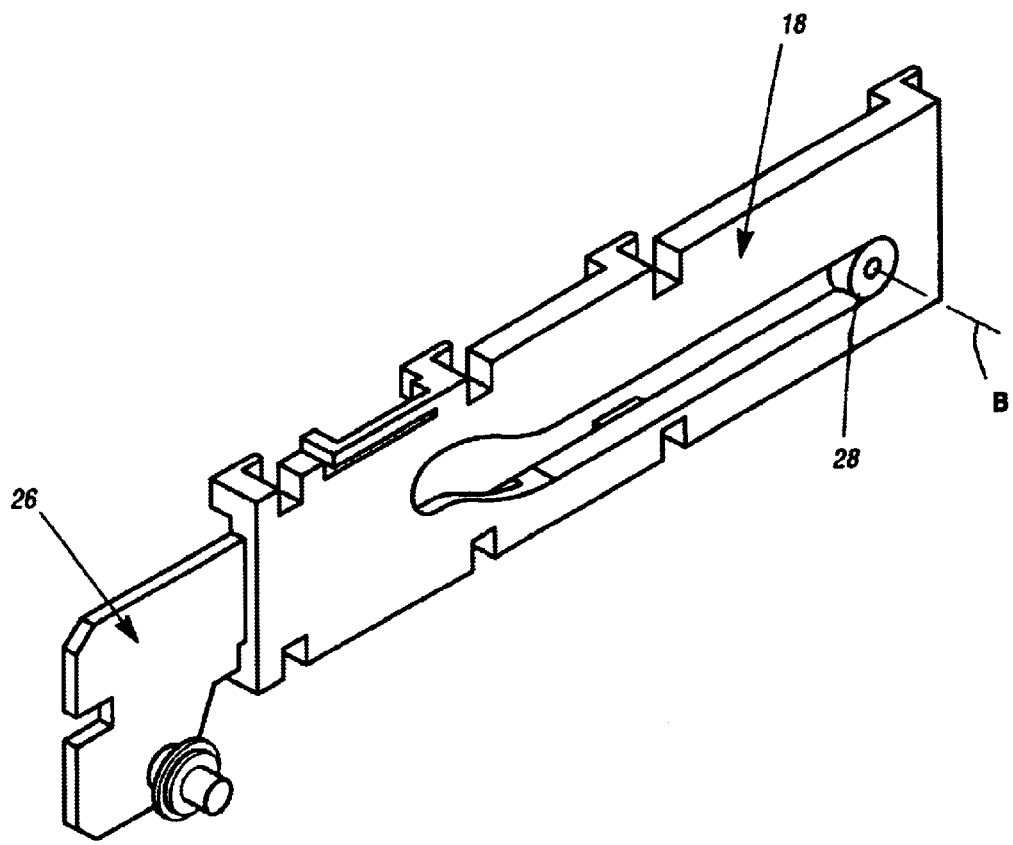
FIG. 8 is a perspective view of an assembly of the mounting bracket and arm components shown in FIGS. 6 and 7.

Referring now to FIG. 8, an assembly of arm 26 and mounting bracket 18 is illustrated. As shown in FIG. 8, the cam follower 28 of arm 26 extends into the slot defining the cam 20 of mounting bracket 18. Again, the cam follower 28 defines the pivot axis "B," about which the orientation of arm 26 can rotate with respect to mounting bracket 18 and chassis 12. In FIG. 8, the arm 26 is shown in its fully retracted position in that the cam follower 28 abuts against a distal end of the slot defining the cam 20. This fully retracted position is also illustrated in FIG. 5A. As the arm 26 is extended from the mounting bracket 18 (see FIG. 1 in which the modular chassis assembly 10 is shown with the arm 26 partially retracted and partially extended with respect to the mounting bracket 18), the cam follower 28 of the arm 26 travels along the distal surface portion 22 of the cam 20 of the mounting bracket 18. Because the distal surface portion 22 of the cam 20 is oriented to extend substantially parallel to the insertion axis "A," the cam follower 28 of the arm 26 will also extend substantially parallel to the insertion axis, and the body 27 of the arm 26 will extend along the channel 25 of the body 19 of the mounting bracket 18.

As the arm 26 is further extended from the mounting bracket 18, the cam follower 28 of the arm 26 will travel along the proximal surface portion 24 of the cam 20. When the arm 26 is fully extended from the mounting bracket 18, the cam follower 28 of the arm 26 will be stopped at a proximal end of the slot defining the cam 20. This position is shown in FIGS. 2–4 and 5B. As cam follower 28 of arm 26 moves along the proximal surface portion 24 of the cam 20, the distal end portion 27A of the arm 26 is moved upwardly (in the orientation shown in the figures) and the proximal end portion 27B of the arm 26 is thereby moved downwardly.

The ramped portion 27C of the body 27 of the arm 26 facilitates the shifting movement of the arm 26 within the channel 25 of the mounting bracket 18. More specifically, as is illustrated in FIG. 5B, the ramped portion 27C of the arm 26 moves toward an upper surface of the channel 25 of the mounting bracket 18.

The cam 20 of the mounting bracket 18 is thus configured such that it has a surface portion (distal surface portion 22) that guides the arm in a direction that is substantially parallel to the insertion axis "A." The cam 20 also has a surface portion (proximal surface portion 24) that guides the arm 26 such that its orientation pivots with respect to the chassis 12. Accordingly, by virtue of the cam 20 of the mounting bracket 18 and the cam follower 28 of the arm 26, a modular component such as modular component 30 is moved along to or more axes, i.e., a first axis corresponding to the insertion axis "A" along which the modular component 30 is installed or removed from the chassis 12, and a second axis that is oriented at an angle to the insertion axis "A."

Referring to FIGS. 5A, 5B, and 7, the modular component 30 optionally includes a locking bracket 2 that is mounted to an external surface of the modular component 30. The locking bracket 2 provides features to which the arm 26 can be mounted for rotational movement. Also, locking bracket 2 includes features to facilitate the locking of the modular component 30 with respect to the arm 26 in a position such that unintended rotation of the modular component 30 with respect to the arm 26 about rotation axis "C" is substantially prevented.

This feature permits the mounting of the modular chassis assembly 10 in any orientation. For example, if the modular chassis assembly 10 is mounted in an inverted position such that the modular component 30 is rotated upwardly away from the insertion axis "A" to provide access to the interior of the chassis 12, then the locking bracket 2, in conjunction with the recess 33 defined in the proximal end portion 27B of the arm 26, retains the modular component 30 in the rotated position after removal so that one can access the interior of the chassis 12 without holding the modular component 30 in place.

In other words, the modular chassis assembly 10 can utilize gravity to hold the modular component 30 in place while access is made to the interior of the chassis 12. Alternatively, a locking bracket 2 and recess 33 are optionally provided so that the modular component 30 can be held in an extended position despite the action of gravity.

Figure 9A:
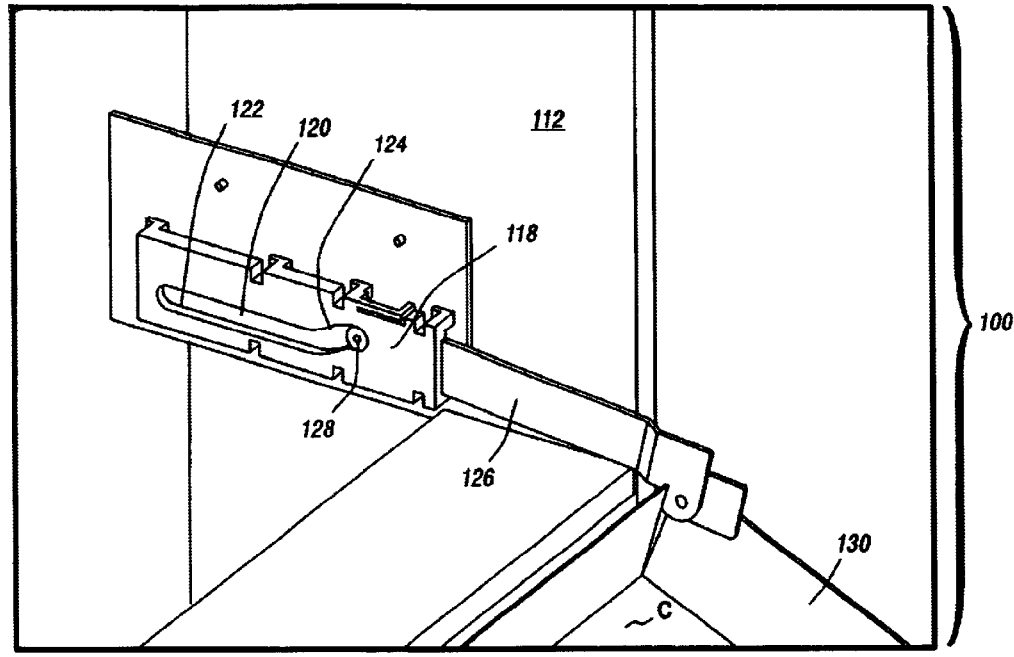
FIGS. 9A and 9B are perspective views of another exemplary embodiment of a modular chassis assembly according to aspects of this invention.
Figure 9B:
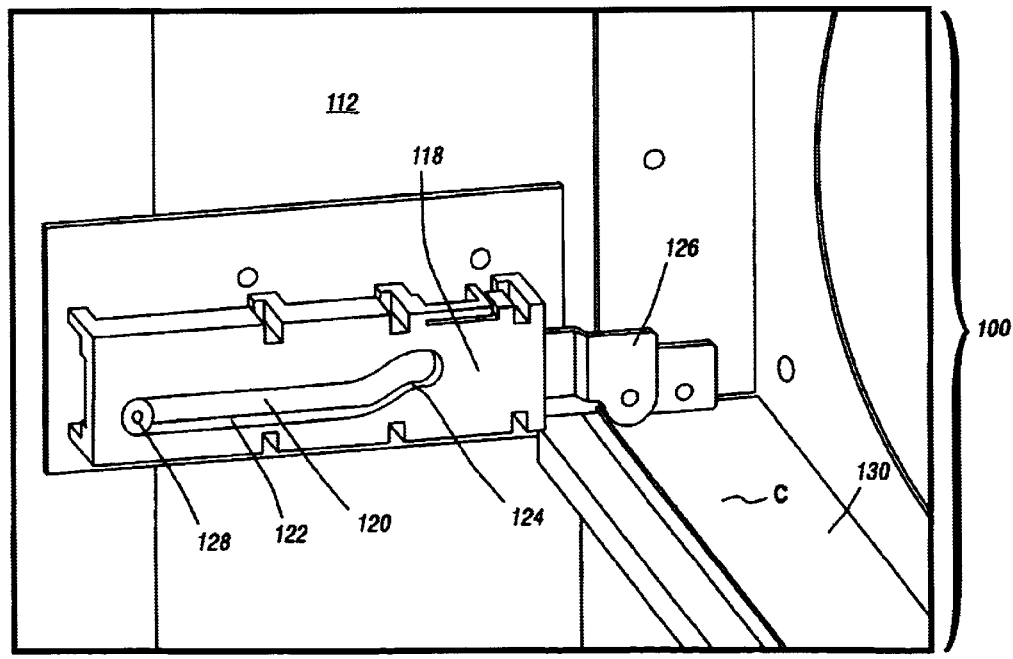

Another exemplary embodiment of a modular chassis assembly, generally designated by the numeral 100, is illustrated in FIGS. 9A and 9B. Like modular chassis assembly 10, modular chassis assembly 100 includes a chassis 112, a mounting bracket 118, an arm 126 and a modular component 130. The mounting bracket 118 includes a slot defining a cam 120 having a distal surface portion 122 and a proximal surface portion 124. A cam follower 128 provided on the arm 126 extends into the slot of the mounting bracket 118 to maintain contact between the cam follower 128 and the distal and proximal surface portions 122 and 124 of the cam 120.

The modular chassis assembly 100 illustrated in FIGS. 9A and 9B differs from modular chassis assembly 10 in that the arm 126 is mounted for rotational movement to an interior surface of the modular component 130. The coupling between the arm 126 and the modular component 130, like the coupling between arm 26 and modular component 30 of modular chassis assembly 10, defines a rotation axis "C." When the arm 126 is in its fully extended position (as shown in FIG. 9A), the modular component 130 can be rotated about rotation axis "C" with respect to arm 126, thereby facilitating access to an interior region of the chassis 112. In contrast, when the arm 126 is fully retracted within the mounting bracket 118 of the modular chassis assembly 100 (see FIG. 9B), and when the modular component 130 is rotated about rotation axis "C" with respect to arm 126 (see FIG. 9B), the modular component 130 is then positioned at least partially within the interior of chassis 112.

Figure 10A:
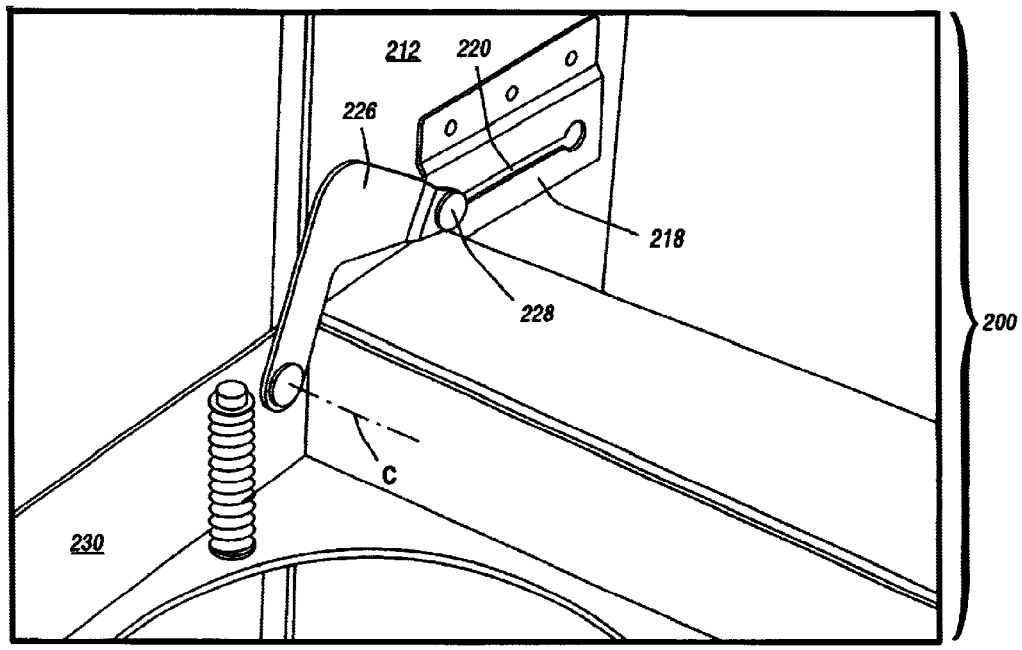
FIGS. 10A and 10B are perspective views of yet another exemplary embodiment of a modular chassis assembly according to aspects of this invention.
Figure 10B:
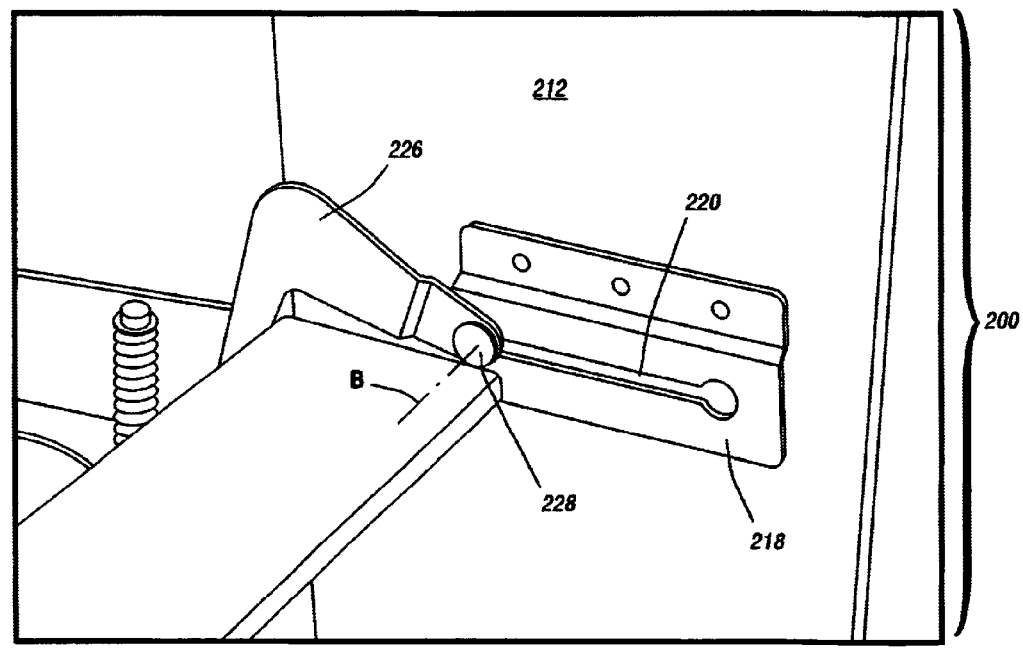

Now referring to FIGS. 10A and 10B, yet another exemplary embodiment of a modular chassis assembly, designated by the is numeral 200, is illustrated. Like modular chassis assemblies 10 and 100, modular chassis assembly 200 includes a chassis 212, a mounting bracket 218 mounted or otherwise connected to the chassis 212, an arm 226, and a modular component 230. The mounting bracket 218 defines a slot forming a cam 220, and a cam follower 228 of arm 226 extends within the slot defining cam 220.

Unlike modular chassis assemblies 10 and 100, the cam 220 of the mounting bracket 218 of modular chassis assembly 200 is configured such that cam follower 228 extends in a direction substantially parallel to the insertion axis "A." In order to facilitate shifting of modular component 230 downwardly (in the orientation illustrated in the figures), arm 226 has an angular shape such that the rotation of the arm 226 about the axis defined by cam follower 228 can occur while avoiding interference between the arm 226 and the surfaces of the chassis 212 adjacent its opening. Accordingly, by rotation of arm 226 with respect to the chassis 212 (about the axis defined by the cam follower 228), the modular component 230 can be moved away from the insertion axis "A," thereby facilitating access to the interior of the chassis 212 through its opening.

Figure 11A:
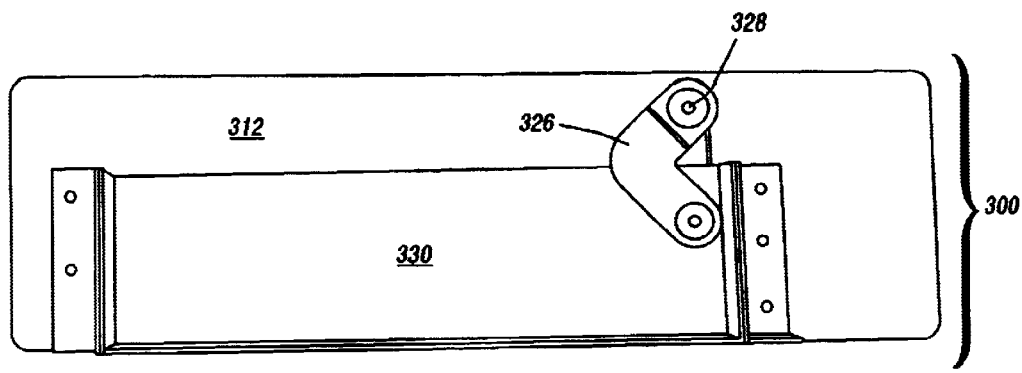
FIGS. 11A and 11B are side views of still another exemplary embodiment of a modular chassis assembly according to aspects of this invention.
Figure 11B:
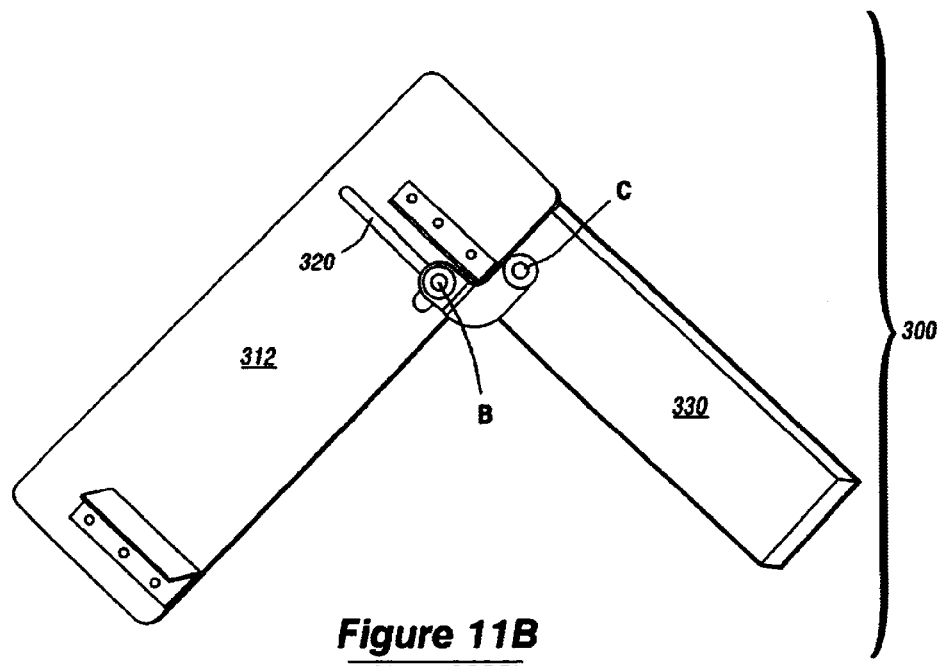

Referring now to FIGS. 11A and 11B, still another exemplary embodiment of a modular chassis assembly, generally designated by the numeral 300, is illustrated. Modular chassis assembly 300 is similar to modular chassis assembly 200 in that it includes an arm 326 having an angular configuration that permits rotation of the modular component 330 away from the insertion axis "A" in order to provide access to the interior of a chassis 312. Like modular chassis assembly 200, modular chassis assembly 300 includes a cam follower 328 on an arm 326 that travels within a slot defining a cam 320, and the coupling between the arm 326 and the modular component 330 defines a rotation axis "C."

Modular chassis assembly 300 differs from modular chassis 200, however, in that the slot defining the cam 320 is formed directly into the surface of the chassis 312. In other words, in this exemplary embodiment, a mounting bracket, such as mounting bracket 18, 118 and 218 of assemblies 10, 100, and 200, can be eliminated.

Figure 12:
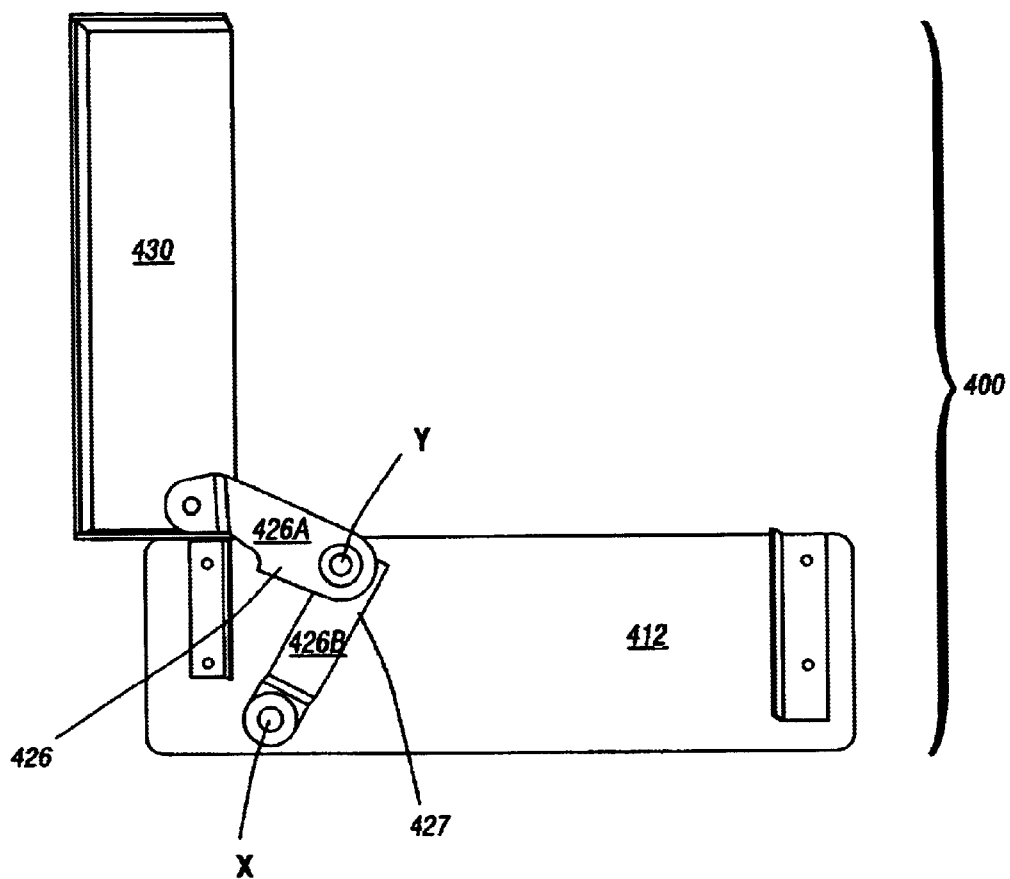
FIG. 12 is a side view of yet another exemplary embodiment of a modular chassis assembly according to aspects of this invention.

Referring now to FIG. 12, yet another exemplary embodiment of a modular chassis assembly, generally designated by the numeral 400, is illustrated. Like modular chassis assemblies 10, 100, 200, and 300, modular chassis assembly 400 includes a chassis 412, an arm 426, and a modular component 430. The modular component 430 can be pivoted into the extended position illustrated in FIG. 12, wherein access to the interior of the chassis 412 is provided. Like the other embodiments, the modular component 430 is coupled to the arm 426 to permit pivotal movement with respect thereto, so that the modular component 430 can be rotated away from the insertion axis "A."

Modular chassis assembly 400 differs from the other embodiments in that the arm 426 is formed from a pair of links designated by a first portion 426A and a second portion 426B. An end of portion 426A is pivotally coupled to a housing of modular component 430, thereby defining a pivot point "Z." Portion 426A of arm 426 is pivotally coupled to portion 426B, thereby defining a pivot point "Y." In turn, portion 426B of arm 426 is pivotally coupled to the chassis 412, thereby defining a pivot point "X."

Unlike the other embodiments, the arm 426 is not configured for movement along a cam and does not include a cam follower. Instead, it is pivotally mounted directly to chassis 412. Extension of arm 426 with respect to the chassis 412 is accomplished by means of pivotal movement about pivot point "Y." In other words, the angle between portions 426A and 426B of arm 426 can be made smaller to retract the arm 426 or larger in order to extend the arm 426. The extension of arm 426 with respect to chassis 412 is further facilitated by rotation of portion 426B with respect to chassis 412 about pivot point "X."

Accordingly, the modular chassis assembly 400 features an arm having distal and proximal segments 426B and 426A, respectively, pivotally coupled to one another. The distal segment 426B of the arm 426 is pivotally coupled to the chassis 412 and the proximal segment 426A of the arm 426 is pivotally coupled to the modular component 430.

Optionally, the arm 426 further includes a stop 427 positioned to limit the rotation of the distal segment 426B of the arm 426 with respect to the proximal segment 426A of the arm 426, thereby limiting the extension of the proximal end portion of the arm with respect to the chassis. Such a stop 427 also helps to maintain the modular component 430 in proximity to the chassis 412 when the modular component 430 is in the extended position (as shown in FIG. 12). The stop 427 therefore prevents over-extension of the arm 426 with respect to the chassis 412 and over-extension of the modular component 430 with respect to the chassis 412.

The portions 426A and 426B of the arm 426 are formed from sheet metal according to an exemplary embodiment of this invention. The stop 427 is optionally provided by a bent portion of one of the arm portions 426A or 426B. In the exemplary embodiment illustrated in FIG. 12, the stop 427 is provided on portion 426B.

Many variations and modifications can be made to the exemplary modular chassis assembly embodiments selected for illustration herein. For example, although exemplary embodiments of the arm and chassis are formed from sheet metal, they can alternatively be formed from a polymeric material. Also, although exemplary embodiments of the mounting brackets are polymeric, they can alternatively be formed from a metal.

It will be appreciated that other modifications can be made to the illustrated embodiments without departing from the scope of the invention, which is separately defined in the appended claims.

What is claimed:

1. A modular chassis assembly comprising:

a chassis defining an access opening;

an arm having a distal end portion coupled to said chassis and a proximal end portion spaced from said distal end portion;

a modular component coupled to said proximal end portion of said arm and configured for insertion into said chassis along an insertion axis, wherein said arm is configured to facilitate displacement of said modular component along said insertion axis and movement of said modular component at an angle to said insertion axis, thereby at least partially facilitating access to said chassis through said access opening;

a cam surface defined by said chassis; and, a cam follower defined by said chassis and said arm, wherein said cam surface and said cam follower are configured to facilitate said displacement and movement of said modular component.

2. The modular chassis assembly recited in claim 1, said cam follower being provided on said arm.

3. The modular chassis assembly recited in claim 1, said insertion axis being substantially perpendicular to said opening of said chassis.

4. The modular chassis assembly recited in claim 1, further comprising a mounting bracket positioned within an interior of said chassis adjacent said opening of said chassis.

5. The modular chassis assembly recited in claim 4, said mounting bracket defining said cam surface.

6. A modular chassis assembly comprising:

a chassis defining an access opening;

an arm having a distal end portion coupled to said chassis and a proximal end portion spaced from said distal end portion;

a modular component coupled to said proximal end portion of said arm and configured for insertion into said chassis along an insertion axis, wherein said arm is configured to facilitate displacement of said modular component along said insertion axis and movement of said modular component at an angle to said insertion axis, thereby at least partially facilitating access to said chassis through said access opening;

a cam surface; and, a cam follower defined by said chassis and said arm, wherein said cam surface and said cam follower are configured to facilitate said displacement and movement of said modular component said cam follower further defining a pivot axis about which the orientation of said arm is pivotable with respect to said chassis.

7. A modular chassis assembly comprising:

a chassis defining an access opening;

an arm having a distal end portion coupled to said chassis and a proximal end portion spaced from said distal end portion; and, a modular component coupled to said proximal end portion of said arm and configured for insertion into said chassis along an insertion axis, said modular component being pivotably coupled to said arm form rotation about a rotation axis extending substantially perpendicular to said insertion axis of said chassis said rotation of said modular component about said rotation axis facilitating rotational movement of said modular component away from said insertion axis, thereby at least partially facilitating access to said interior of said chassis through said opening of said chassis;

said arm being configured to facilitate displacement of said modular component along said insertion axis and movement of said modular component at an angle to said insertion axis, thereby at least partially facilitating access to said chassis through said access opening.

8. A modular chassis assembly comprising:

a chassis defining an access opening;

an arm having a distal end portion coupled to said chassis and a proximal end portion pivotably coupled to said distal end portion;

a modular component coupled to said proximal end portion of said arm and configured for insertion into said chassis along an insertion axis;

said arm being configured to facilitate displacement of said modular component along said insertion axis and movement of said modular component at an angle to said insertion axis, thereby at least partially facilitating access to said chassis through said access opening.

9. The modular chassis assembly recited in claim 8, said distal segment of said arm being pivotably coupled to said chassis and said proximal segment of said arm being pivotally coupled to said modular component.

10. The modular chassis assembly recited in claim 9, said arm further comprising a stop positioned to limit the rotation of said distal segment of said arm with respect to said proximal segment of said arm, thereby limiting the extension of said proximal end portion of said arm with respect to said chassis.

11. A modular chassis assembly comprising:

a chassis defining an interior and an opening for access to said interior, said chassis defining an insertion axis extending substantially perpendicular to said opening;

at least one mounting bracket positioned within said interior of said chassis adjacent said opening of said chassis, said mounting bracket defining a cam;

an arm coupled to said mounting bracket, said arm comprising a cam follower positioned adjacent a surface of said cam of said mounting bracket, said cam follower of said arm defining a pivot axis about which the orientation of said arm is pivotable with respect to said mounting bracket;

a modular component configured for insertion into said interior of said chassis through said opening of said chassis, said modular component being pivotally coupled to said arm for rotation about a rotation axis extending substantially perpendicular to said insertion axis of said chassis;

said cam follower of said arm being configured to facilitate movement of said modular component at an angle to said insertion axis, and said rotation of said modular component about said rotation axis extending rotational movement of said modular component away from said insertion axis, thereby facilitating access to said interior of said chassis through said opening of said chassis.

12. The modular chassis assembly recited in claim 11, said cam of said mounting bracket hang a proximal surface portion extending at an angle to said insertion axis.

13. The modular chassis assembly recited in claim 12, said proximal surface portion of said cam of said mounting bracket being configured to facilitate movement of said modular component at an angle to said insertion axis.

14. The modular chassis assembly recited in claim 12, said arm having an extended position with said cam follower adjacent said proximal surface portion of said cam of said mounting bracket.

15. The modular chassis assembly recited in claim 14, said modular component having a removed position outside said interior of said chassis with said arm in said extended position.

16. The modular chassis assembly recited in claim 11, said cam of said mounting bracket having a distal surface portion extending substantially parallel to said insertion axis.

17. The modular chassis assembly recited in claim 16, said am having a retracted position with said cam follower adjacent said distal surface portion of said cam of said mounting bracket.

18. The modular chassis assembly recited in claim 17, said modular component having an installed position at least partially within said interior of said chassis with said arm in said retracted position.

19. The modular chassis assembly recited in claim 11, comprising a plurality of mounting brackets.

20. The modular chassis assembly recited in claim 19, comprising a plurality of arms, one of said arms being coupled to each of said mounting brackets.

21. The modular chassis assembly recited in claim 11, said modular component comprising a looking bracket pivotally coupled to said arm for rotation about said rotation axis, said locking bracket being configured to selectively lock the position of said modular component with respect to said arm to prevent said rotational movement.

22. The modular chassis assembly recited in claim 11, said mounting bracket defining a slot forming said cam, said cam follower of said arm extending through said slot of said mounting bracket.

23. A modular chassis assembly comprising:
   a chassis defining an interior and an opening for access to said interior, said chassis defining an insertion axis extending substantially perpendicular to said opening;
   at least one mounting bracket positioned within said interior of said chassis adjacent said opening of said chassis, said mounting bracket defining a cam having a proximal surface portion extending at an angle to said insertion axis;
   an arm coupled to said mounting bracket, said arm comprising a cam follower positioned adjacent said cam of said mounting bracket, and said arm having an extended position with said cam follower adjacent said proximal surface portion of said cam of said mounting bracket, said cam follower of said arm defining a pivot axis about which the orientation of said arm is pivotable with respect to said mounting bracket;
   a modular component configured for insertion into said interior of said chassis through said opening of said chassis, said modular component being pivotally coupled to said arm for rotation about a rotation axis extending substantially perpendicular to said insertion axis of said chassis, said modular component having a removed position outside said interior of said chassis with said arm in said extended position; and
   said cam follower of said arm and said proximal surface portion of said cam of said mounting bracket being configured to facilitate movement of said modular component at an angle to said insertion axis, and said rotation of said modular component about said rotation axis facilitating rotational movement of said modular component away from said insertion axis, thereby facilitating access to said interior of said chassis through said opening of said chassis.

24. The modular chassis assembly recited in claim 23, said cam of said mounting bracket having a distal surface portion extending substantially parallel to said insertion axis.

25. The modular chassis assembly recited in claim 23, said arm having a retracted position with said cam follower adjacent said distal surface portion of said cam of said mounting bracket.

26. The modular chassis assembly recited in claim 25, said modular component having an installed position at least partially within said interior of said chassis with said arm in said retracted position.

27. The modular chassis assembly recited in claim 23, comprising a plurality of mounting brackets.

28. The modular chassis assembly recited in claim 27, comprising a plurality of arms, one of said arms being coupled to each of said mounting brackets.

29. The modular chassis assembly recited in claim 23, said modular component comprising a looking bracket pivotally coupled to said arm for rotation about said rotation axis, said locking bracket being configured to selectively look the position of said modular component with respect to said arm to prevent said rotational movement.

30. The modular chassis assembly recited in claim 23, said mounting bracket defining a slot forming said cam, said cam follower of said arm extending through said slot of said mounting bracket.

31. A modular chassis assembly comprising:
   a chassis defining an interior and an opening for access to said interior, said chassis defining an insertion axis extending substantially perpendicular to said opening;
   mounting brackets positioned within said interior of said chassis adjacent said opening of said chassis, each of said mounting brackets defining a cam having a distal surface portion extending substantially parallel to said insertion axis and a proximal surface portion extending at an angle to said insertion axis;
   an arm coupled to each of said mounting brackets, each of said arms comprising a cam follower positioned adjacent said cam of one of said mounting brackets, and each of said arms having a retracted position with said cam follower adjacent said distal surface portion of said cam of one of said mounting brackets and an extended position with said cam follower adjacent said proximal surface portion of said cam of one of said mounting brackets, said cam follower of each of said arms defining a pivot axis about which the orientations of said arms are pivotable with respect to said mounting brackets;
   a modular component configured for insertion into said interior of said chassis through said opening of said chassis, said modular component being pivotally coupled to said arms for rotation about a rotation axis extending substantially perpendicular to said insertion axis of said chassis;
   said modular component having an installed position at least partially within said interior of said chassis with said arms in said retracted position, and said modular component having a removed position outside said interior of said chassis with said arms in said extended position; and
   said cam follower of each of said arms being configured to facilitate movement of said modular component at an angle to said insertion axis, said proximal surface portion of said cam of each of said mounting brackets being configured to facilitate movement of said modular component at an angle to said insertion axis, and said rotation of said modular component about said rotation axis facilitating rotation of said modular component away from said insertion axis, thereby facilitating access to said interior of said chassis through said opening of said chassis.

* * * * *